(12) United States Patent
Kawase

(10) Patent No.: US 7,025,677 B2
(45) Date of Patent: Apr. 11, 2006

(54) GAME EMULATOR PROGRAM

(75) Inventor: Tomohiro Kawase, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 580 days.

(21) Appl. No.: 10/335,880

(22) Filed: Jan. 3, 2003

(65) Prior Publication Data

US 2004/0053691 A1    Mar. 18, 2004

(30) Foreign Application Priority Data

Sep. 13, 2002    (JP)    ............................ 2002-269184

(51) Int. Cl.
*A63F 13/00*    (2006.01)
(52) U.S. Cl. .............................. 463/33; 463/32; 703/23
(58) Field of Classification Search ............ 463/30–34, 463/43; 703/23–28; 345/619
See application file for complete search history.

(56) References Cited

U.S. PATENT DOCUMENTS

| | | | | |
|---|---|---|---|---|
| 5,556,108 A | * | 9/1996 | Nagano et al. | ................ 463/45 |
| 5,982,373 A | * | 11/1999 | Inman et al. | ................ 345/419 |
| 6,043,802 A | * | 3/2000 | Gormish | ..................... 345/596 |
| 6,115,054 A | * | 9/2000 | Giles | ........................... 345/522 |
| 6,672,963 B1 | * | 1/2004 | Link | ........................... 463/43 |

FOREIGN PATENT DOCUMENTS

| | | |
|---|---|---|
| JP | 2002-027038 | 1/2002 |
| JP | 027038 | 2/2002 |

* cited by examiner

*Primary Examiner*—Xuan M. Thai
*Assistant Examiner*—Jeffrey C. Panos
(74) *Attorney, Agent, or Firm*—Nixon & Vanderhye, PC

(57) ABSTRACT

The present disclosure is directed to a game emulator program that allows a game to be played on a game machine using a display device having a resolution that is lower than the resolution for which the game is designed, while reproducing a game image that is close to that of the original.

16 Claims, 16 Drawing Sheets

Fig. 7

| n$^{th}$ FRAME ||| n+1$^{th}$ FRAME |||
|---|---|---|---|---|---|
| COUNTER | OFFSET VALUE | READ-OUT HORIZONTAL LINE | COUNTER | OFFSET VALUE | READ-OUT HORIZONTAL LINE |
| 1 | 0 | 1 | 1 | 0 | 1 |
| 2 | 0 | 2 | 2 | 0 | 2 |
| 3 | 0 | ③ | 3 | 1 | ④ |
| 4 | 1 | 5 | 4 | 1 | 5 |
| 5 | 1 | 6 | 5 | 1 | 6 |
| 6 | 1 | ⑦ | 6 | 2 | ⑧ |

8 DOTS
8 LINES
1 2 3 4 5 6 7 8

$n^{th}$ FRAME
1 2 4 5 6 8
8 LINES $n+1^{th}$ FRAME
1 2 3 5 6 7

2 FRAMES

GAME EMULATOR PROGRAM

BACKGROUND OF THE INVENTION

1. Field of the Invention

The present invention relates to a game emulator program, and more particularly to a game emulator program for use in a game machine whose display screen resolution is lower than that of the emulated game machine.

2. Description of the Background Art

State-of-the-art hand-held game machines are advanced to the point that they are capable of emulating legacy video game machines, or the like. An emulator program for emulating Nintendo Entertainment System, a legacy video game machine, on Game Boy Advance®, a state-of-the-art hand-held game machine, is currently under development. By running the emulator program on Game Boy Advance®, games for Nintendo Entertainment System can be played on Game Boy Advance®.

There are disclosed, in the prior art, emulation techniques that enable games designed for other game machines to be played on a hand-held device.

However, Nintendo Entertainment System is connected to a television set and produces a game image with a resolution of 240×256 (vertical×horizontal) dots, whereas the liquid crystal monitor of Game Boy Advance® has a lower resolution of 160×240 (vertical×horizontal) dots. Therefore, when a game image of Nintendo Entertainment System is displayed as it is on the liquid crystal monitor of Game Boy Advance®, the upper 40 horizontal lines and the lower 40 horizontal lines (or the lower 80 horizontal lines) of the game image are not displayed, whereby the game becomes unplayable in such non-displayable areas. Thus, in a case where game software designed for a particular game machine is run on another game machine, the difference in display screen resolution causes a problem. No effective solution to this problem has yet been proposed in the art.

One possible solution to the problem is to match the vertical resolution of the game image to that of the liquid crystal monitor of the Game Boy Advance® by evenly decimating the game image by 80 horizontal lines. In such a case, however, the game image is partially dropped for the decimated horizontal lines, thereby detracting from the atmosphere of the original game of Nintendo Entertainment System.

Another possible solution is to employ a general image processing method for resolution adjustment, whereby the number of pixels is reduced by taking an average of pixels around each predetermined pixel in the image. However, such an image process imposes a substantial computational load and is not suitable for use with a game emulator program that runs a game in real time while emulating a heterogeneous game machine.

SUMMARY OF THE INVENTION

Therefore, an object of the present invention is to provide a game emulator program capable of reproducing a game image that is close to the original game image even when a game is played on a game machine of a lower resolution.

Another object of the present invention is to provide a game emulator program that allows a game machine to perform a game process with a reduced computational load.

The present invention has the following features to attain the above objects.

A first aspect of the present invention is directed to a computer-readable recording medium, comprising a game emulator program (referred to as "emulator program 31" in the description of the preferred embodiments) recorded thereon for executing a game program ("game program 32") that is designed for a first game machine ("heterogeneous game machine") using a display device of a first resolution on a second game machine ("hand-held game machine 1") using a display device of a second resolution lower than the first resolution. The game program includes data of a background image ("background image data 33") and data of an object image ("object image data 34"). The data of the background image is image data of the first resolution for forming a background of a game image. The object image is image data to be overlaid on the background image. In a predetermined frame in which the game image is generated by executing the game program, the game emulator program instructs the second game machine to perform the following steps. First, for horizontal lines and/or vertical lines of the background image, a first decimation line based on which the background image is decimated by lines is determined (CPU 201 performing "Step 31 and Step 35"; only step numbers will be shown hereinafter). Next, the resolution of the first background image is converted to the second resolution by successively outputting lines of the first background image while skipping a line of the first background image corresponding to the first decimation line ("Step 36"). Next, lines of a first game image are generated by overlaying the object image on the lines of the background image being outputted when the object image concurs with the lines of the background image being outputted ("Step 38"). Thereafter, the lines of the first game image are successively supplied to the display device of the second resolution ("Step 38"), thereby displaying the first game image on the display device of the second resolution ("Step 39"). In a next frame following the predetermined frame, the game emulator program instructs the second game machine to perform the following steps. First, one of two lines adjacent to the first decimation line is determined to be a second decimation line ("Step 31 and Step 35"). Next, the resolution of the first background image is converted to the second resolution by successively outputting the lines of the first background image while skipping a line of the first background image corresponding to the second decimation line ("Step 36"). Next, lines of a second game image are generated by overlaying the object image on the lines of the background image being outputted when the object image concurs with the lines of the background image being outputted ("Step 38"). Thereafter, the lines of the second game image are successively supplied to the display device of the second resolution ("Step 38"), thereby displaying the second game image on the display device of the second resolution ("Step 39").

According to the first aspect, substantially all image information contained in the original game image can be displayed in the predetermined frame and the following frame. Therefore, it is possible to provide a game emulator program that does not detract from the atmosphere of the original game, which is designed for a legacy game machine, even if the display device has a lower resolution. Moreover, the object image is not decimated. Therefore, the object image, which the player chiefly looks at while playing the game, does not partially flicker and is easy to look at. Furthermore, because a process that imposes a substantial computational load, such as a pixel-based compression process, is not performed, the game machine can perform the game process with a reduced computational load. Thus, the first aspect of the present invention is quite effective as a game emulator program. Moreover, data is supplied to the display device while performing the decimation process by lines in real time. This avoids a copy operation between frame memories, or the like, thereby realizing a higher operation speed.

A second aspect of the present invention is directed to a computer-readable recording medium, comprising a game emulator program recorded thereon for executing a game program that is designed for a first game machine using a display device of a first resolution on a second game machine using a display device of a second resolution lower than the first resolution. The game program ("game program 32") includes data of a first background image ("background image data 33") of the first resolution for forming a background of a game image and data of an object image ("object image data 34") to be overlaid on the first background image. The game emulator program instructs the second game machine to perform the following steps. First, for horizontal lines and/or vertical lines of the first background image, a first decimation line based on which the first background image is decimated by lines is determined ("Step 31 and Step 82"). Moreover, the first background image is converted into a second background image of the second resolution by removing a line of the first background image corresponding to the first decimation line ("Step 84"). Furthermore, one of two lines adjacent to the first decimation line is determined to be a second decimation line ("Step 31 and Step 82"). Moreover, the first background image is converted into a third background image of the second resolution by removing a line of the first background image corresponding to the second decimation line ("Step 84"). Moreover, a first game image is generated by overlaying the object image on the second background image ("Step 84"). Moreover, a second game image is generated by overlaying the object image on the third background image ("Step 38"). Moreover, the first game image and the second game image are displayed alternately by frames on the display device of the second resolution ("Step 86").

According to the second aspect, substantially all image information contained in the original game image can be displayed in the predetermined frame and the following frame. Therefore, it is possible to provide a game emulator program that does not detract from the atmosphere of the original game, which is designed for a legacy game machine, even if the display device has a lower resolution. Moreover, the object image is not decimated. Therefore, the object image, which the player chiefly looks at while playing the game, does not partially flicker and is easy to look at. Furthermore, because a pixel-based process, which imposes a substantial computational load, is not performed, the game machine can perform the game process with a reduced computational load. Thus, the second aspect of the present invention is quite effective as a game emulator program.

In the first or second aspect, it is preferred that the game emulator program further instructs the second game machine to perform the following. At least two different offset value sequences ("offset value sequences 46") are generated, each offset value sequence being a factor in determining a decimation line based on which the background image of the first resolution is decimated by lines. The first decimation line is determined based on a value in one of the offset value sequences and a value specifying a horizontal line of the background image of the first resolution. The second decimation line is determined based on a value in the other one of the offset value sequences and a value specifying a horizontal line of the background image of the first resolution.

Thus, the decimation line is determined in real time based on the offset value sequences, which are obtained in advance. Therefore, it is possible to realize a higher operation speed, as compared to the process in which it is necessary to determine, for each line, whether or not the line is a decimation line.

In the first or second aspect, the first decimation line may be determined for every certain number of lines. Thus, the image is decimated evenly across the entire image. If the image is decimated in a localized manner, the image may substantially vary from one frame to another, whereby the displayed image may be hard to see. This problem can be solved by determining the first decimation line for every certain number of lines.

In the first or second aspect, it is preferred that the game emulator program further instructs the second game machine to perform the following: a position at which the object image is overlaid on the background image whose resolution has been converted to the second resolution is determined, based on a position at which the object image is overlaid on the first background image and a ratio between the first resolution and the second resolution ("Step 4").

Thus, the position at which the object image is displayed on the background image of the second resolution is determined while it is changed according to the degree by which the background image is converted. Therefore, the position at which the object image is displayed on the background image is not substantially shifted from the intended position, whereby it is possible to provide the player with a controllability similar to that provided by the original game image.

In the first or second aspect, it is preferred that the display device of the second resolution is a non-interlaced display device.

The first decimation line may be selected from among the horizontal lines, or the first decimation line may alternatively be selected from among the horizontal lines and the vertical lines.

In the first or second aspect, it is preferred that the game emulator program further instructs the second game machine to perform the following steps. The object image is converted into a second object image by removing a line of the object image corresponding to the first decimation line (note that in the first aspect, this is done in the "predetermined frame"). Moreover, the object image is converted into a third object image by removing a line of the object image corresponding to the second decimation line (note that in the first aspect, this is done in the "next frame"). The first game image is generated by overlaying the second object image on the background image whose resolution has been converted to the second resolution, and the second game image is generated by overlaying the third object image on the background image whose resolution has been converted to the second resolution.

Thus, the object image is subjected to a process similar to that for the background image, thereby eliminating the need for adjusting the position of the object according to the resolution.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram illustrating how decimation lines are determined in the decimation method illustrated in FIG. 6.

DESCRIPTION OF THE PREFERRED EMBODIMENTS

Figure 1:
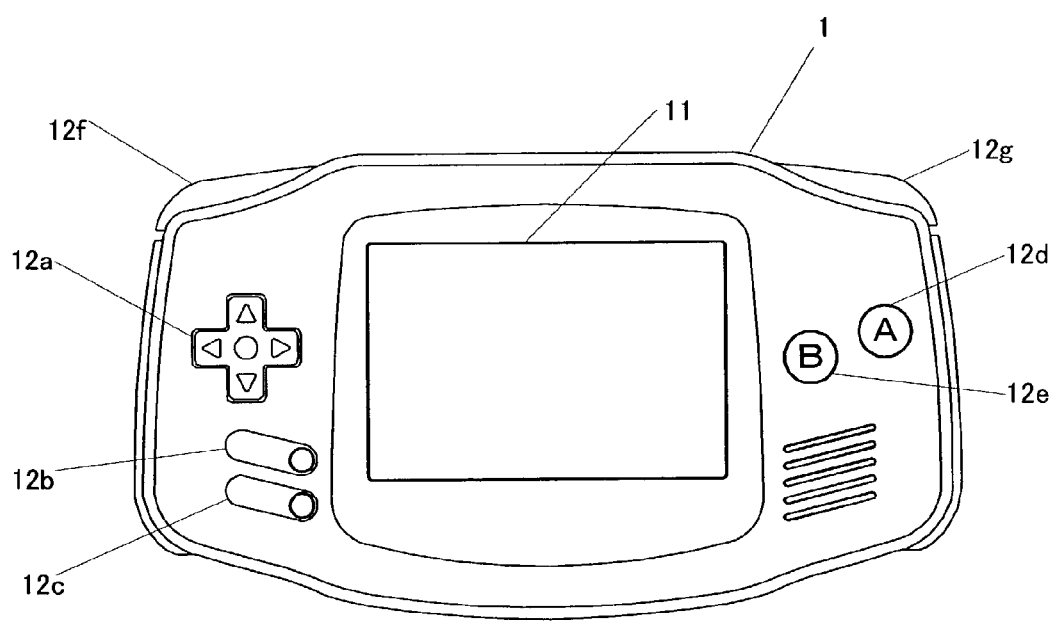
FIG. 1 is a diagram generally illustrating a hand-held game machine according to one embodiment of the present invention.

FIG. 1 is a diagram generally illustrating a hand-held game machine 1 according to one embodiment of a second game machine of the present invention. Note that the second game machine is not limited to a hand-held game machine, but the present invention is applicable to other devices such as a stationary video game machine, a mobile telephone or a PDA (Personal Digital Assistance) capable of running a game program.

The hand-held game machine 1 (e.g., "Game Boy Advance(R)" manufactured and sold by the assignee of the present application) includes a liquid crystal monitor 11 (hereinafter referred to simply as "LCD 11"), which is a display means, and a plurality of control buttons 12a to 12g operated by the player, etc. The cross button 12a, the start button 12b and the select button 12c are provided on the left side of the LCD 11. The A button 12d and the B button 12e are provided on the right side of the LCD 11. The L button 12f is provided on the upper left side of the hand-held game machine 1, and the R button 12g is provided on the upper right side of the hand-held game machine 1. The control buttons 12a to 12g, when operated by the player, give predetermined operation instructions to the game process. Furthermore, the hand-held game machine 1 includes a slot on its reverse side for receiving a game cartridge (see FIG. 2). The game cartridge is an example of a storage medium for storing a game program designed for a heterogeneous game machine (e.g., "Nintendo Entertainment System" manufactured and sold by the assignee of the present application), an emulator program for emulating the heterogeneous game machine, etc. The heterogeneous game machine is an example of the first game machine of the present invention.

Figure 2:
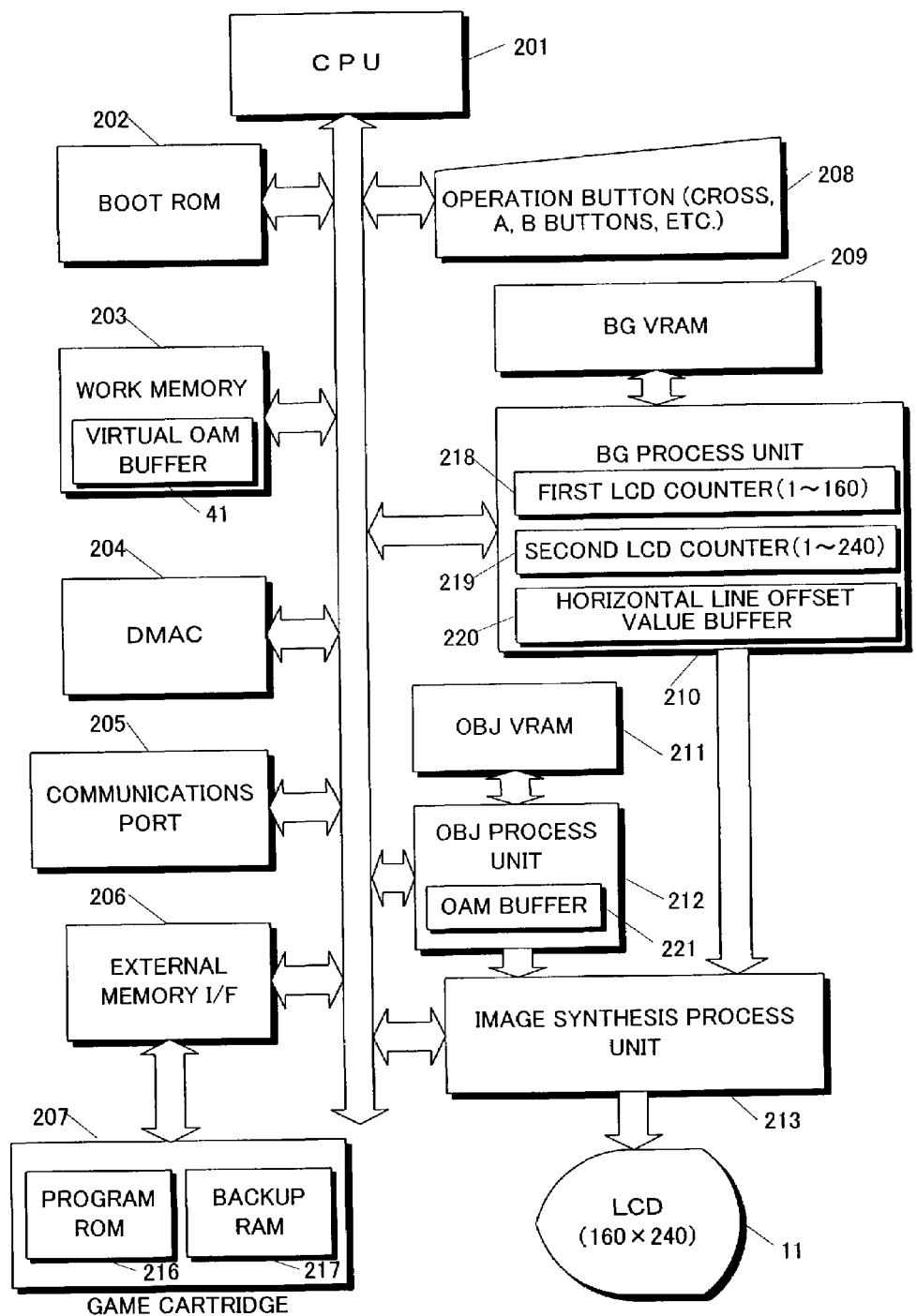
FIG. 2 is a block diagram illustrating a configuration of hand-held game machine 1 and a game cartridge.

FIG. 2 is a block diagram illustrating a configuration of the hand-held game machine 1 and the game cartridge. As illustrated in FIG. 2, the hand-held game machine 1 includes a CPU 201 for directly executing the emulator program. The CPU 201 indirectly executes a heterogeneous game program via the emulator program. The term "heterogeneous game program" as used herein refers to a game program that cannot be executed directly by the hand-held game machine 1, but can be executed by a game machine (hereinafter referred to as "heterogeneous game machine") employing an architecture different from that of the hand-held game machine 1. Thus, the heterogeneous game program is a program that is executed by the emulator program. Connected to the CPU 201 are a boot ROM 202, a work memory 203, a DMAC (Direct Memory Access Controller) 204, a communications port 205, an external memory I/F 206, a control button 208, a background process unit (BG process unit) 210, an object process unit (OBJ process unit) 212, and an image synthesis process unit 213. Moreover, a BG VRAM 209 is connected to the BG process unit 210. An OBJ VRAM 211 is connected to the OBJ process unit 212. The LCD 11 is connected to the image synthesis process unit 213. Furthermore, in the present embodiment, a game cartridge 207 is connected to the external memory I/F 206. The game cartridge 207 includes a program ROM 216 storing a heterogeneous game program (hereinafter referred to simply as "game program") and an emulator program, and a backup RAM 217 for backing up game data. Note that while the heterogeneous game program and the emulator program are stored in the same recording medium (or storage medium) in the present embodiment, they may be stored separately in different recording or storage media, for example.

Figure 3:
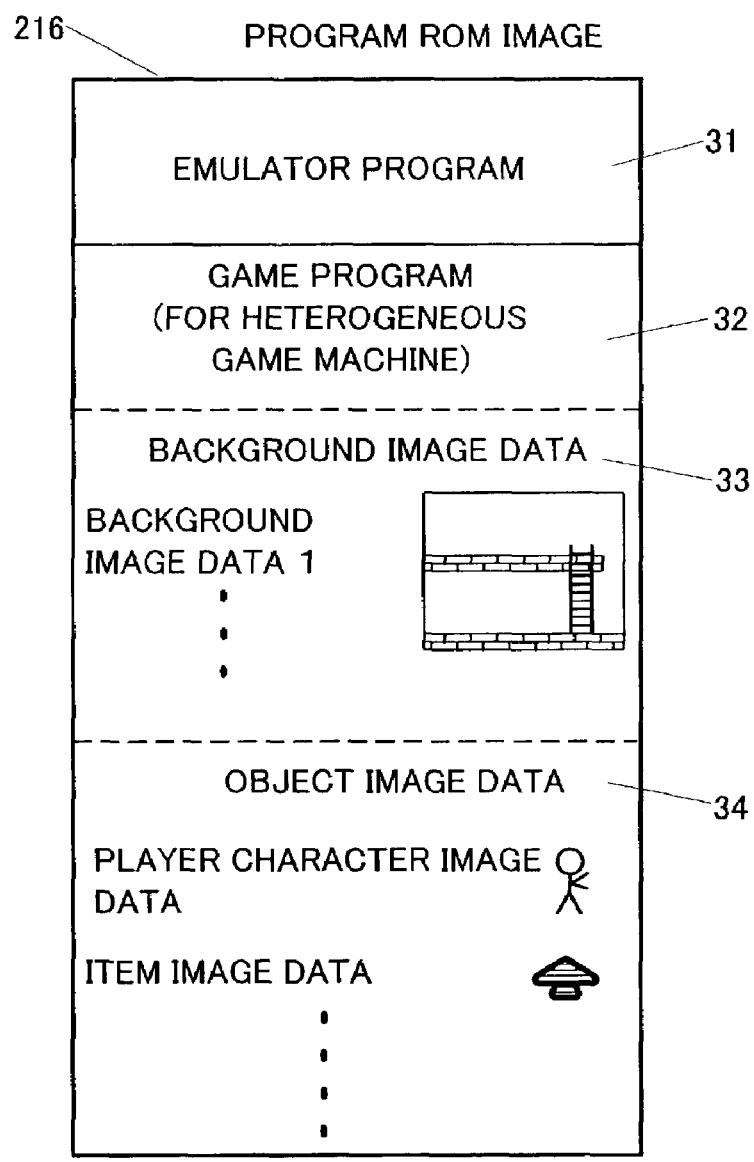
FIG. 3 is a diagram illustrating an example of data stored in a program ROM 216 of a game cartridge 207.
Figure 4:
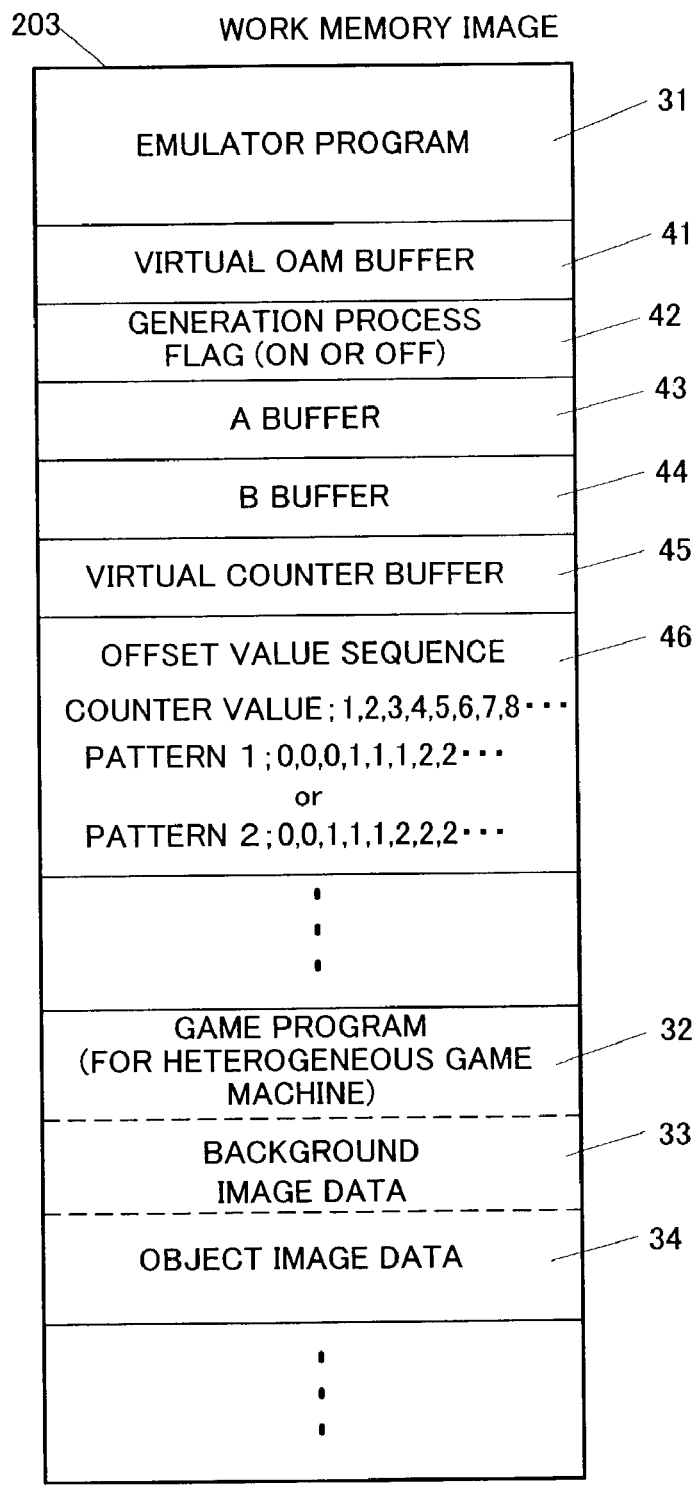
FIG. 4 is a diagram illustrating an example of data stored in a work memory 203.

As the power of hand-held game machine 1 is turned ON, the CPU 201 executes a start-up program stored in the boot ROM 202 for initialization of memory, etc., and then reads out data from the game cartridge 207. Thus, the emulator program and the game program stored in the program ROM 216 of the game cartridge 207 are transferred to the work memory 203. FIG. 3 and FIG. 4 illustrate specific examples of the program ROM 216 and the work memory 203, respectively. The CPU 201 executes the emulator program and the game program in the work memory 203 to start the game process. The DMAC 204 controls the data transfer in an integrated manner. The communications port 205 allows the hand-held game machine 1 to communicate with an external device (e.g., another game machine).

FIG. 3 is a diagram illustrating an example of data stored in the program ROM 216 of the game cartridge 207. As illustrated in FIG. 3, an emulator program 31 and a game program 32 are stored in the program ROM 216. The game program 32 includes background image data 33 and object image data 34. The background image data 33 is data mainly for displaying a background image in a game image. The object image data 34 is data mainly for displaying an object image, i.e., a portion of the game image other than the background. For example, the object image data 34 includes player object image data for displaying the image of an object to be controlled by the player, and item image data for displaying the image of an item that appears in the game.

FIG. 4 is a diagram illustrating an example of data stored in the work memory 203. A portion or the whole (the whole in the present embodiment) of the program stored in the program ROM 216, e.g., the emulator program 31 and the game program 32, is transferred to and stored in the work memory 203, as illustrated in FIG. 4. As the emulator program 31 is executed, various memory areas are allocated in the work memory 203 for emulating a heterogeneous game machine (e.g., Nintendo Entertainment System in the present embodiment). Specifically, memory areas to be allocated include a virtual OAM buffer 41, a generation process flag 42, an A buffer 43, a B buffer 44, and a virtual counter buffer 45 (for example, when emulating Nintendo Entertainment System, 64 OAM buffers are allocated). The work memory 203 also stores an offset value sequence 46 (or "offset values") to be generated as the emulator program 31 is executed.

Various data for the heterogeneous game machine that are generated as the game program 32 is executed are written in the virtual OAM buffer 41, including object names (also called "character names" or "character codes"), display coordinates, enlarge/shrink rates, etc. An object name specifies an image of a particular object to be displayed. Display coordinates indicate the position on the background image at which an object is to be displayed. The generation process flag 42 contains data that indicates whether the flag is ON or OFF. The generation process flag 42 will be described later. The offset value sequence 46 is a collection of offset values used in the game image display process to be described later. The offset value sequence 46 is generated in the decimation offset value generation process (see FIG. 14) to be described later, and is written in the work memory 203. The A buffer 43 and the B buffer 44 are used when generating the offset value sequence 46. The virtual counter buffer 45 is used in a variation of the present embodiment to be described later.

In the present embodiment, it is assumed that the game program 32 is written in the work memory 203 at start-up of the hand-held game machine 1. In other embodiments, the game program 32 may be read out in portions from the cartridge as necessary.

Referring back to FIG. 2, during the game process, the hand-held game machine 1 performs a so-called "sprite process" by using the BG process unit 210 and the OBJ process unit 212 to generate a game image. The OBJ process unit 212 outputs the object image data to the image synthesis process unit 213 based on data stored in an OAM buffer (Object Attribute Memory) 221. The coordinates indicating the position at which an object is to be displayed, the object name that specifies an image of an object, and the like, for the hand-held game machine 1 are written in the OAM buffer 221. The OBJ VRAM 211 is used for storing object image data, which is read out from the work memory 203.

The BG process unit 210 converts the background image data 33 stored in the work memory 203 into an image that is suitable for the resolution of the LCD 11. For such conversion, the BG process unit 210 includes a first LCD counter 218, a second LCD counter 219, and a horizontal line offset value buffer 220. The BG VRAM 209 is used for storing the object image data 34 read out from the work memory 203. The BG process unit 210 reads out a predetermined horizontal line of the background image data 33 from the BG VRAM 209, based on the first LCD counter 218 and the value of the horizontal line offset value buffer 220, and outputs the horizontal line to the image synthesis process unit 213. Note that the background image data from the BG process unit 210 and the object image data from the OBJ process unit 212 are outputted to the image synthesis process unit 213 in synchronization with each other for each horizontal line of the game image.

The image synthesis process unit 213 synthesizes together the background image data and the object image data for each line, and outputs the synthesized image data to the LCD 11. The LCD 11 displays the game image based on the image data synthesized by the image synthesis process unit 213. As a result, the displayed game image includes the background image and the object image being overlaid on the background image. Note that while the LCD 11 is used in the present embodiment as a non-interlaced display device, the display device may alternatively be a non-interlaced CRT (Cathode-Ray Tube) monitor for computers, or an interlaced television set, for example.

Note that in the description above, the game cartridge 207 is used as an example of a recording medium for recording the emulator program 31 and the game program 32. However, the emulator program and the game program may be obtained by any other method. For example, the emulator program 31 and the game program 32 may be supplied from another game machine that can be connected to the hand-held game machine 1, and directly stored in the work memory 203. In such a case, the cartridge is not needed. Alternatively, these programs may be supplied from an optical recording medium (e.g., a DVD-ROM) or a magnetic recording medium, instead of the game cartridge 207. It may also be possible that a card on which the game program is recorded in the form of a barcode is used as the recording medium. In such a case, a barcode reader storing the emulator program may be attached to the hand-held game machine 1. The emulator program and the game program may be stored separately in different recording media, and may be obtained by different methods.

Before describing the specific process performed by the computer of the hand-held game machine 1, the general operation of the hand-held game machine 1 will be described with reference to FIG. 5 to FIG. 11B.

Figure 5A:
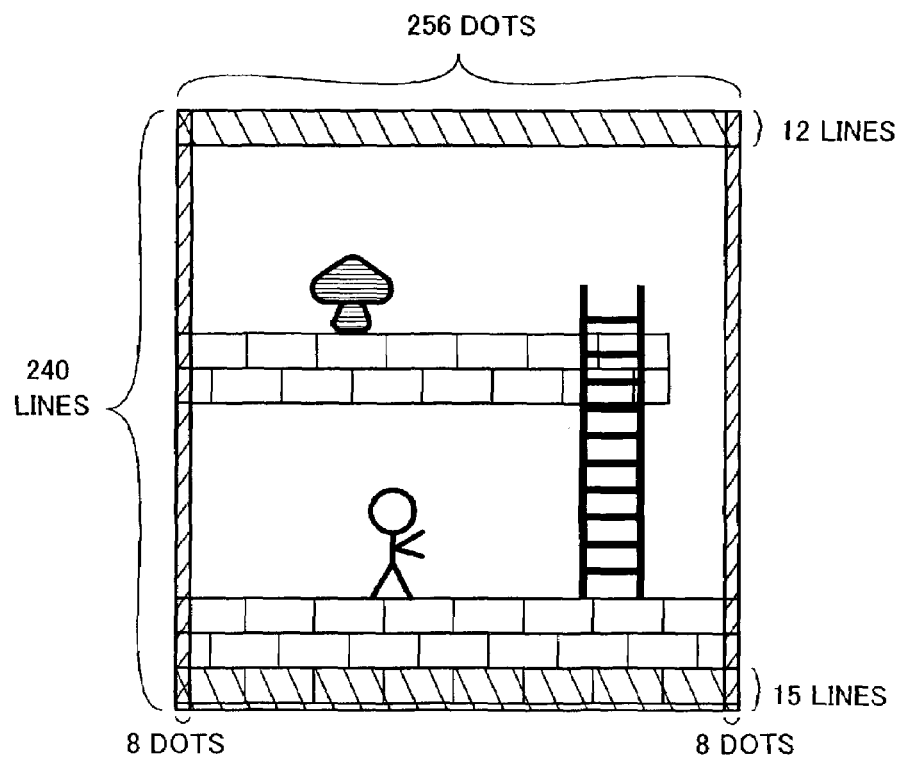
FIG. 5A is a diagram illustrating an example of a game image displayed by a display device of a first resolution.
Figure 5B:
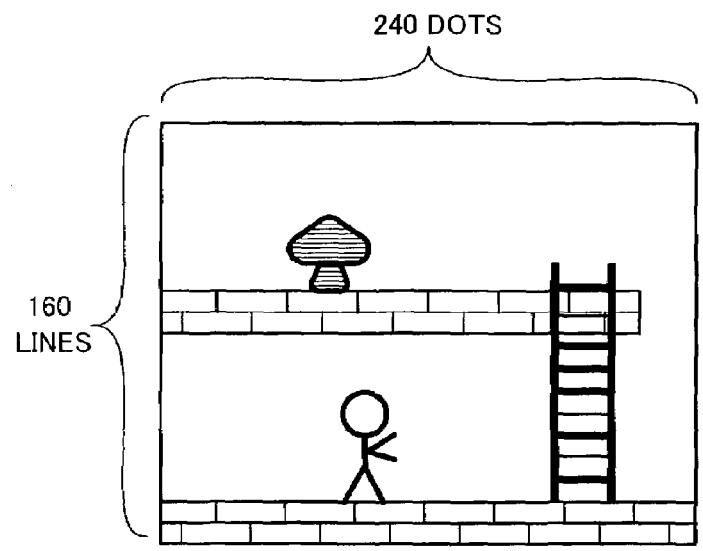
FIG. 5B is a diagram illustrating an example of a game image displayed by a display device of a second resolution.

FIG. 5A is a diagram illustrating an example of a game image displayed by a display device of a first resolution (e.g., a television set; hereinafter referred to simply as "TV set"). FIG. 5B is a diagram illustrating an example of a game image displayed by a display device of a second resolution (e.g., a small-size liquid crystal monitor). Herein, the resolution of the display device of the heterogeneous game machine is referred to as "first resolution", and that of the display device (LCD 11) of the hand-held game machine 1 is referred to as "second resolution". Since the game program 32 is a program executed by a game machine that is connected to a TV set, the image data used by the program is stored with the first resolution (e.g., 240×256 (herein, the resolution is represented in the order of "vertical×horizontal" unless otherwise indicated)) that is determined on the assumption that the image is displayed on a TV set (see FIG. 5A). On the other hand, the second resolution is a resolution suitable for the hand-held game machine 1 (160×240 dots). Thus, the second resolution as illustrated in FIG. 5B is lower than the first resolution. Therefore, the hand-held game machine 1 performs a process of removing a predetermined number of lines from a game image that is obtained by executing the game program 32. The line decimation process of the present embodiment is performed only on the background image but not on the object image. The line decimation method will now be described.

In the present embodiment, the background image represented by the background image data 33 included in the game program 32 is decimated by lines by excluding the upper 12 horizontal lines, the lower 15 horizontal lines, the eight right-side vertical lines and the eight left-side vertical lines (the hatched portion of FIG. 5A). Herein, the excluded portion is outside the "safety frame" and does not contain information that is necessary to play the game. The portion of a given image that is displayed within the display area of the screen varies depending on the type and the performance of the TV set, which may differ from one manufacturer to another, and the safety frame is determined in view of such variations. The image information contained within the safety frame is always displayed on any TV set. Therefore, excluding a portion of the image outside the safety frame does not hinder the player in playing the game.

After excluding a portion of the background image outside the safety frame, as described above, the resulting background image has a size of 213×240 dots. Thus, the background image matches the second resolution with respect to the number of vertical lines. However, it is still necessary to further decimate the horizontal lines of the background image. A method for decimating horizontal lines will now be described with reference to FIG. 6 and FIG. 7.

Figure 6:
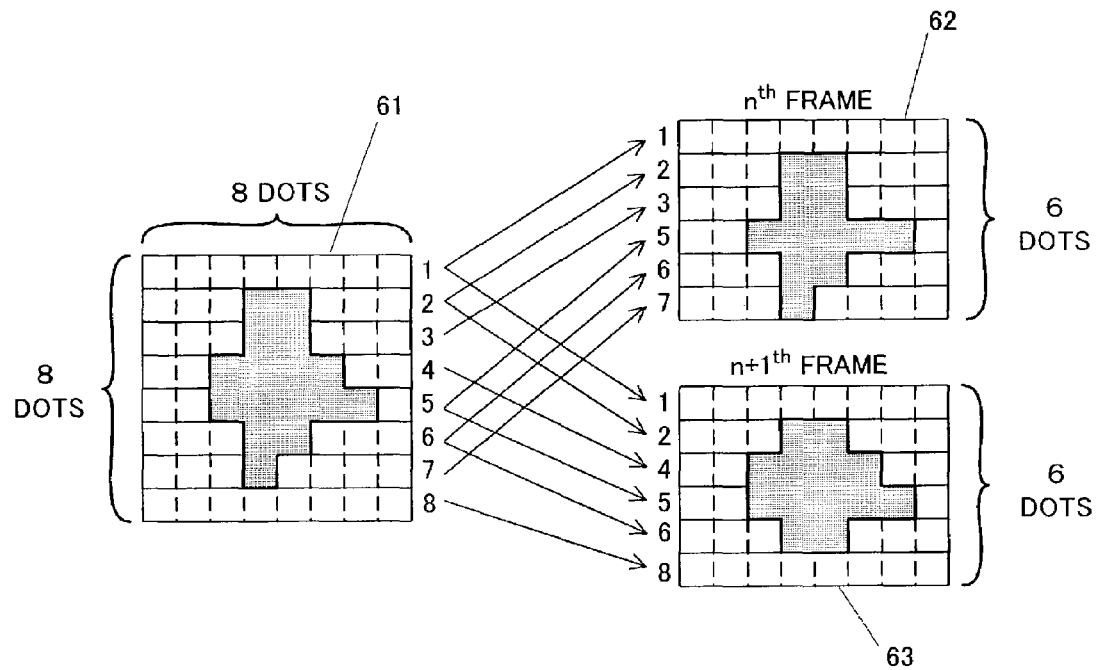
FIG. 6 is a diagram generally illustrating a method for decimating horizontal lines.

FIG. 6 is a diagram generally illustrating the method for decimating horizontal lines. An image 61 is, for example, a portion (8×8 dots) of an undecimated game image. The image 61 is decimated by a predetermined number of lines in an $n^{th}$ frame (the "predetermined frame" of the present invention) to obtain an image 62, and in an $n+1^{th}$ frame (the "next frame" of the present invention, which follows the "predetermined frame") to obtain an image 63. In the present embodiment, the number of horizontal lines needs to be reduced from 213 lines to 160 lines, which can be done by removing one line out of about every four lines. In view of this, the image 61 is decimated by two lines so as to reduce the number of horizontal lines from eight lines to six lines, as illustrated in FIG. 6. Herein, each line to be removed from an image is referred to as "decimation line".

FIG. 7 is a diagram illustrating how decimation lines are determined in the decimation method illustrated in FIG. 6. In FIG. 7, the value of the first LCD counter 218 is shown in the column labeled "Counter". The counter value 'i' (i is a natural number) corresponds to the $i^{th}$ line in the decimated background image. The column "Read-out horizontal line" shows one of the horizontal lines in the undecimated background image that is to be read out by the BG process unit 210. Thus, where the counter value is i, the read-out horizontal line number being 'j' (j is a natural number) means that the $i^{th}$ horizontal line in the decimated background image is the $j^{th}$ horizontal line in the undecimated background image.

The column "Offset value" shows values contained in the offset value sequence 46, and are each used for calculating a read-out horizontal line number from the counter value. The read-out horizontal line number is obtained by adding together the value of the counter (first LCD counter 218) and the offset value corresponding to the counter value. In the present embodiment, an offset value is set for each counter value for determining a read-out horizontal line. In FIG. 7A, the sequence of offset values is (0, 0, 0, 1, 1, 1), whereby the sequence of the read-out horizontal line numbers is determined to be (1, 2, 3, 5, 6, 7). In other words, the decimation lines are determined to be the fourth and eighth horizontal lines. Then, the fourth and eight horizontal lines are removed from the undecimated image 61, thereby obtaining the decimated image 62.

Figure 15:
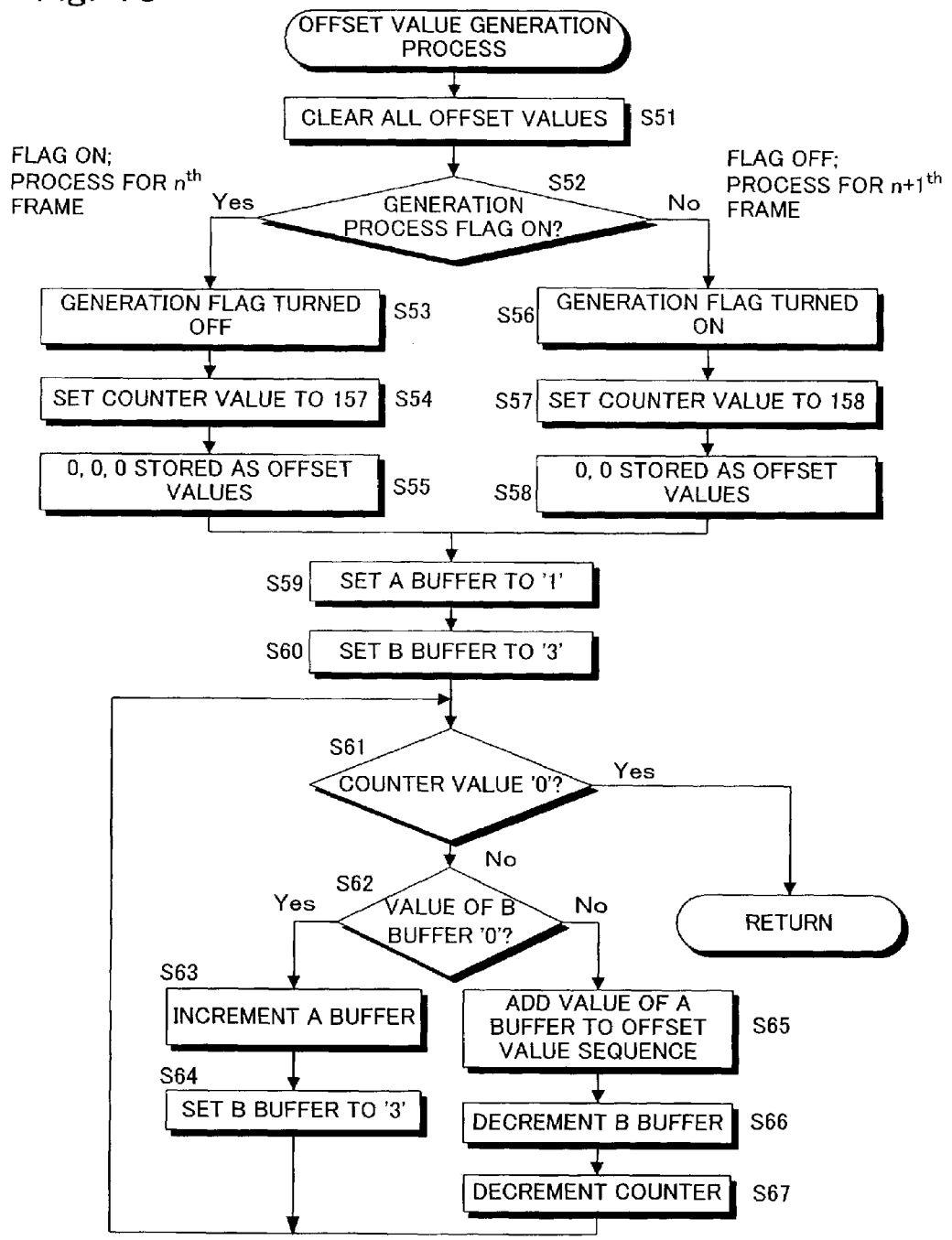
FIG. 15 is a flowchart illustrating the details of an offset value generation process of Step 31.

As described above, one out of every four horizontal lines is removed in the present embodiment. Therefore, the offset value sequence 46 is generated so that the same value occurs three times consecutively, after which the value is incremented by one. Thus, it is ensured that one out of every consecutive four lines is removed. It is also ensured that a line is removed for every certain number of lines. A method for generating such an offset value sequence 46 is illustrated in FIG. 15.

Moreover, in the present embodiment, offset values are changed at the transition from the $n^{th}$ frame to the following $n+1^{th}$ frame. Thus, the read-out horizontal line numbers are also changed at the transition, thereby changing the decimation lines. Specifically, in the $n^{th}$-frame image 62, the fourth and eighth horizontal lines are removed, whereas in the $n+1^{th}$-frame image 63, the third and seventh horizontal lines are removed. Thus, in the $n^{th}$ frame and in the $n+1^{th}$ frame, different yet adjacent lines are removed. In the present embodiment, the decimation lines are changed every frame according to the method described above by using two different offset value sequences and selecting one of the sequences that is different from the sequence selected in the previous frame.

Herein, an undecimated background image ("the background image of the first resolution") is referred to as "first background image". Where a background image of the second resolution that is generated by the decimation process in a frame is referred to as "second background image", a background image of the second resolution that is generated by the decimation process in the following frame is referred to as "third background image". Thus, in the present embodiment, the second background image and the third background image are generated alternately by frames. The decimation lines determined in the decimation process for the second background image are different from those for the third background image.

Figure 8:
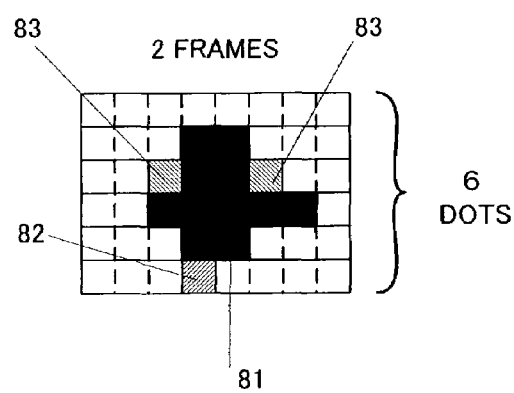
FIG. 8 is a diagram illustrating an example of an image obtained by overlaying two decimated images on each other.

FIG. 8 is a diagram illustrating an example of an image obtained by overlaying two decimated images on each other. The image 62 and the image 63 are displayed respectively in two adjacent frames. Then, when the image of the latter frame is displayed, the image of the former frame, which is remaining as an after-image, appears to human eyes to be overlaid on the image of the latter frame, as illustrated in FIG. 8. In FIG. 8, a solid black portion 81 is where the pixels are lit in both frames. A hatched portion 82 is where the pixels are lit only in an even-numbered frame (assuming that n in FIG. 6 is an even number), whereas a hatched portion 83 is where the pixels are lit only in an odd-numbered frame (i.e., the $n+1^{th}$ frame in FIG. 6). Thus, the portion where the pixels are lit in both of two adjacent frames appears in a dark color, whereas the other portion appears in a faint color. As a result, even though the original image is decimated, an image that is close to the original image can be displayed.

Figure 9A:
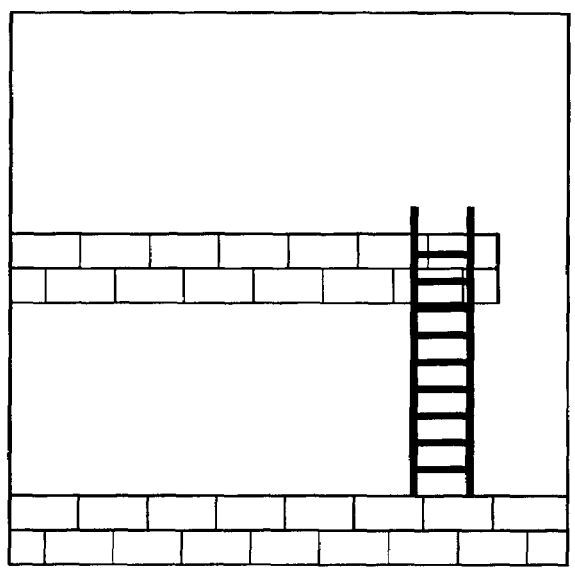
FIG. 9A is a diagram illustrating an undecimated background image.
Figure 9B:
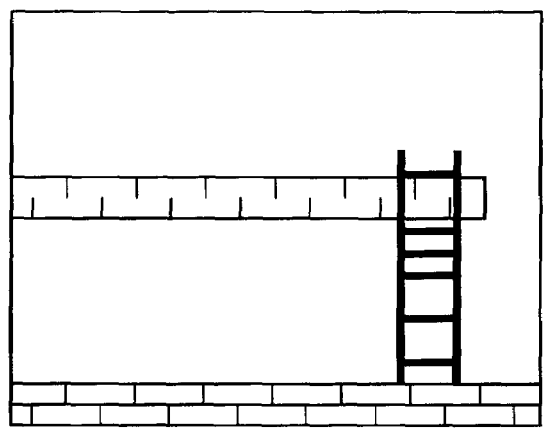
FIG. 9B is a diagram illustrating a decimated background image in an even-numbered frame.
Figure 9C:
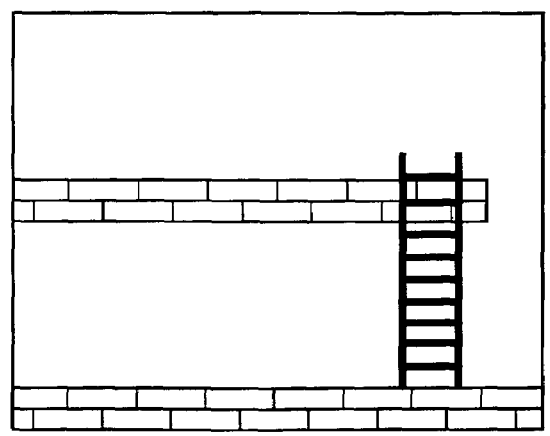
FIG. 9C is a diagram illustrating a decimated background image in an odd-numbered frame.

FIG. 9A to FIG. 9C are diagrams illustrating undecimated and decimated background images. FIG. 9A is a diagram illustrating an undecimated background image (the original background image represented by the background image data 33 included in the game program 32). FIG. 9B is a diagram illustrating a decimated background image in an even-numbered frame. In FIG. 9B, the ladder and the bricks are drawn with some lines missing, because horizontal lines containing such missing lines have been removed. FIG. 9C is a diagram illustrating a decimated background image in an odd-numbered frame. In FIG. 9C, those lines that are missing in an even-numbered frame are drawn, and the interval between adjacent ladder steps is shortened as some horizontal lines are removed between the adjacent ladder steps, for example. Note that also in an odd-numbered frame, the background image may be drawn with some missing portions as in an even-numbered frame. However, any portion that is missing in an odd-numbered frame is drawn in an even-numbered frame.

Figure 10:
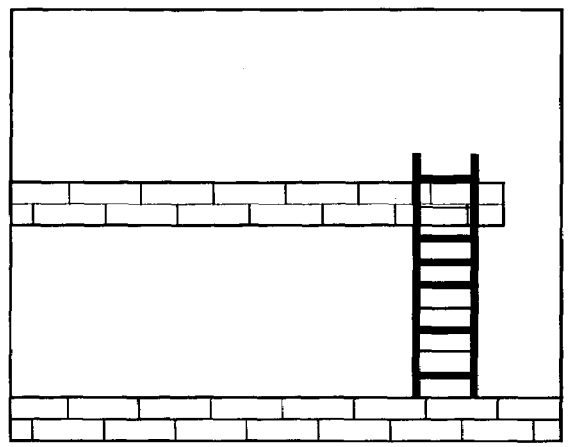
FIG. 10 is a diagram illustrating an example of an image obtained by overlaying an image in an even-numbered frame and an image in an odd-numbered frame on each other.

FIG. 10 is a diagram illustrating an example of an image obtained by overlaying an image in an even-numbered frame and an image in an odd-numbered frame on each other. In FIG. 10, a background image that is close to the original, undecimated background image is displayed with substantially all information contained in the original background image, including horizontal lines of the ladder and the bricks. Note that in FIG. 10, a bold line is used to draw a portion where the pixels are lit both in an even-numbered frame and in an odd-numbered frame, and a thin line is used to draw a portion where the pixels are lit only in one of the frames. As described above, in the present embodiment, substantially all information contained in the original, undecimated background image is displayed in two adjacent frames of an $n^{th}$ frame and an $n+1^{th}$ frame.

In the description of the present embodiment, one frame corresponds to a screen full of image data to be displayed on a display device. Although for an interlaced display device such as a television set, one frame may mean two screens full of image data (two fields), it is herein assumed that one frame means a screen full of image data whether it is an interlaced display device or a non-interlaced display device.

Figure 11A:
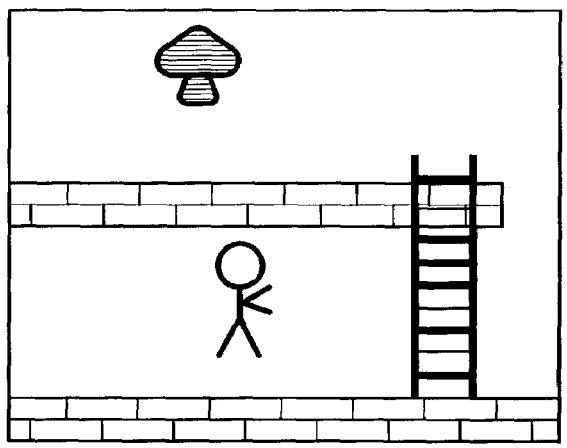
FIG. 11A is a diagram illustrating an example of an image obtained by overlaying object images on a background image in a case where the position at which each object image is displayed is not corrected.
Figure 11B:
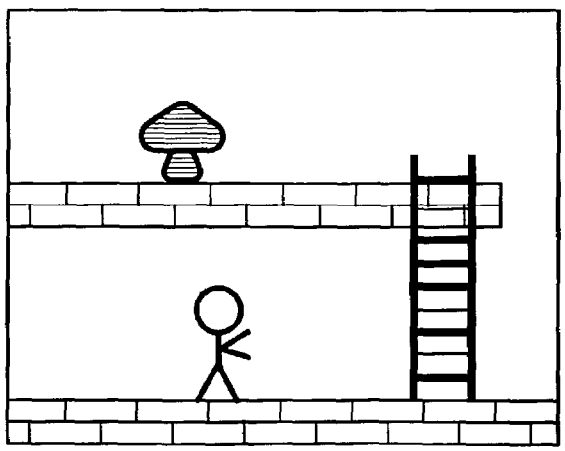
FIG. 11B is a diagram illustrating an example of an image obtained by overlaying object images on a background image in a case where the position at which each object image is displayed is corrected.

In the present embodiment, a process of correcting the position at which an object image is displayed is performed, in addition to the decimation process described above. FIG. 11A and FIG. 11B each illustrate an example of an image obtained by overlaying object images on a background image. FIG. 11A illustrates an example where the position at which each object image is displayed is not corrected. Specifically, FIG. 11A illustrates an example of a game image obtained by overlaying object images on a resolution-converted background image, with the object coordinates being unconverted. This is an example where the object images are placed using their unconverted coordinates despite the vertical shrinkage of the background image, which results from the resolution conversion, whereby the object images are shifted from their intended positions. More specifically, the game image as illustrated in FIG. 11A results from the fact that a counter value may not always coincide with the corresponding read-out horizontal line number, as illustrated in FIG. 7. In other words, the position of a line before the decimation process may not always coincide with that after the decimation process. For example, the counter value may be 100 when the read-out horizontal line number is 125. In such a case, a portion of a background image that is displayed in the $125^{th}$ horizontal line before the decimation process is displayed in the $100^{th}$ horizontal line after the decimation process. However, object image data is not decimated, whereby a portion of an object image that is displayed in the $125^{th}$ horizontal line before the decimation process is displayed in the $125^{th}$ horizontal line also after the decimation process. As a result, a portion of the background image and a portion of the object image that are supposed to be displayed at the same position are displayed at different positions (see FIG. 11A). In view of this, in the present embodiment, the position at which an object image is displayed is adjusted according to the decimation process performed.

Specifically, the coordinates (X, Y) of an object image are converted to new coordinates (X', Y') according to Expression (1) below:

$$(X', Y') = (X-8, (Y-12)/H1 \times H2) \qquad (1)$$

where H1 is the first resolution along the vertical direction, and H2 is the second resolution along the vertical direction. Note that 8 is subtracted from the horizontal coordinate (X) in order to exclude 8 vertical lines, and 12 is subtracted from the vertical coordinate (Y) in order to exclude 12 horizontal lines. Then, the difference is multiplied by the ratio between the first and second resolutions (H2/H1) because the vertical size of the decimated background image is H2/H1 times that of the undecimated background image. Thus, the position at which the object image is displayed is changed by the same ratio by which the vertical size of the background image is changed. As described above, by adjusting the display coordinates of the object image according to the change that the background image undergoes through the decimation process, the position at which the object image is displayed can be substantially matched with the background image (see FIG. 11B).

Now, the specific process performed by the hand-held game machine 1 will be described with reference to FIG. 12 to FIG. 16. The process to be described below is performed as the CPU 201 executes the emulator program 31 and the game program 32 in the work memory 203 after the power of the hand-held game machine 1 is turned ON.

Figure 12:
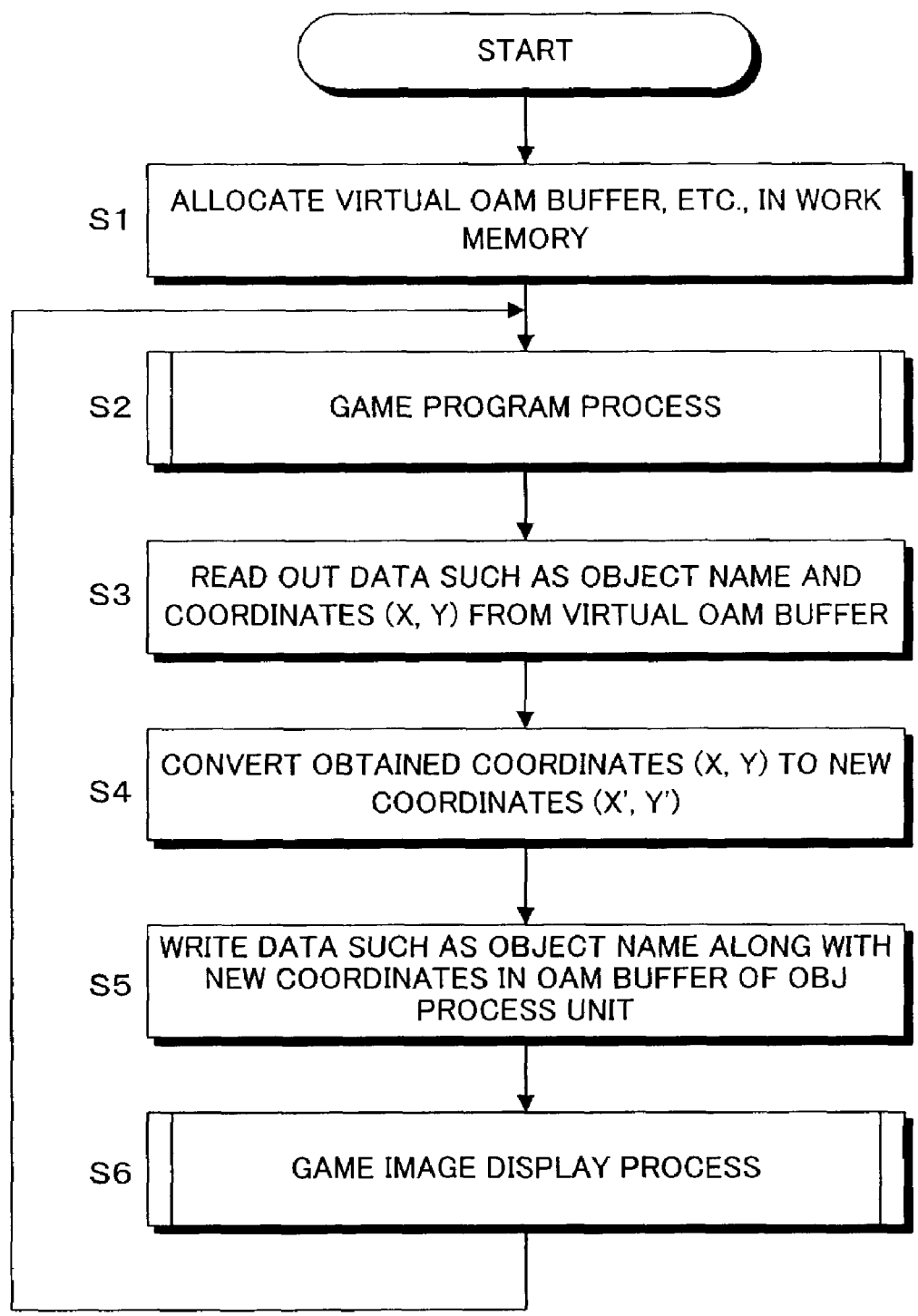
FIG. 12 is a flowchart of a process performed by the hand-held game machine 1.

FIG. 12 is a flowchart of the process performed by the hand-held game machine 1. First, in Step 1 ("Step" is abbreviated as "S" in this and other flowcharts), the emulator program 31 is executed by the CPU 201. In this step, memory areas that are necessary for the emulation (e.g., virtual OAM buffers) are allocated in the work memory 203 (see FIG. 4). In Step 2, the game program 32 is executed via the emulator program 31 (in other words, the emulator program 31 executes the game program 32). In Step 2, one frame of game image based on the game program 32 is set. In other words, in Step 2, a game image is generated that can suitably be displayed by a heterogeneous game machine on a display device of the first resolution (a background image and an object image are generated, and the display coordinates of the object image are set). Step 2 will now be described in detail with reference to FIG. 13.

Figure 13:
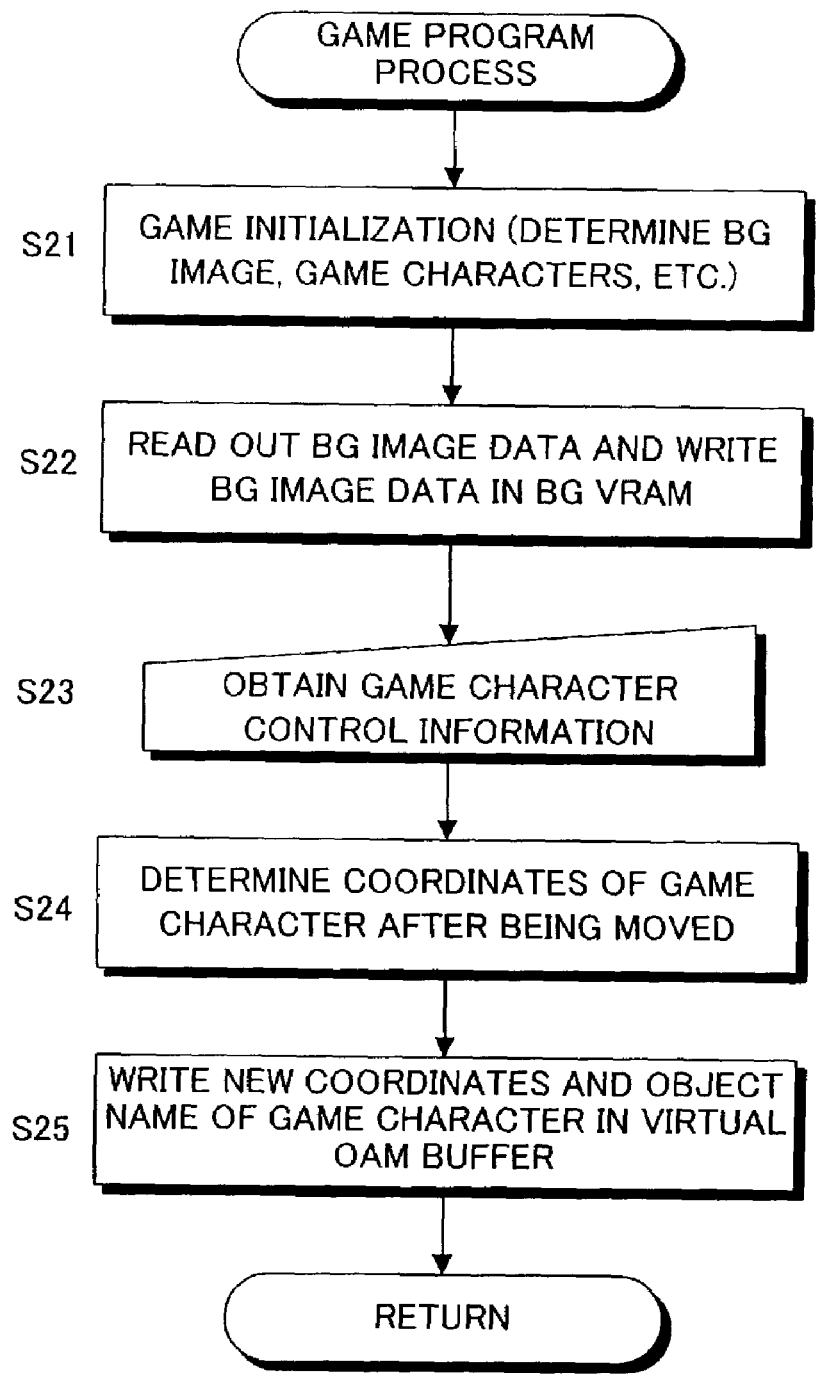
FIG. 13 is a flowchart illustrating the details of a game program process of Step 2.

FIG. 13 is a flowchart illustrating the details of the game program process of Step 2. First, in Step 21, initialization of the game is performed. Specifically, in Step 21, a background image, a game character image, etc., to be displayed in the following frame are determined. In Step 22, background image data of the background image determined in Step 21 is read out from the work memory 203, and the BG process unit 210 is instructed to write the background image data in the BG VRAM 209. Then, in Step 23, game character control information stored in a controller port (not shown) is obtained. Note that the control port temporarily stores information that is outputted from the control button 208 in response to the operation by the player. Then, in Step 24, the coordinates of the game character after it is moved are determined based on the control information obtained in Step 23. Then, in Step 25, the coordinates of the game character after it is moved, the object name of the game character, etc., are written in the virtual OAM buffer 41. Through Step 21 to Step 25 as described above, there is generated data that is required for generating a game image that can suitably be displayed by the heterogeneous game machine on a TV set. If the game image based on the data is displayed, as it is, on the LCD 11, some information necessary for playing the game may be lost due to the resolution difference. In order to display a game image that contains all information necessary for playing the game, Step 3 to Step 6 are performed as follows.

Referring back to FIG. 12, in Step 3, data such as the coordinates (X, Y) and the object name of the game character are read out from the virtual OAM buffer 41. In Step 4, the read-out coordinates (X, Y) are converted into new coordinates (X', Y'). The conversion is done by using Expression (1) above. In Step 5, data such as the new coordinates and the object name are written in the OAM buffer 221. In Step 6, the game image display process is performed by the CPU 201, etc. The game image display process is illustrated in detail in FIG. 14. After completion of Step 6, the loop procedure from Step 2 to Step 6 is repeated. One frame of image is generated and displayed by a single iteration of the loop from Step 2 to Step 6. Note that for every iteration of the loop, a different offset value sequence 46 is generated in Step 31 to be described later. By removing different lines in one frame and in the following frame by using the offset values in the offset value sequence 46, it is possible to display an adequate game image utilizing the phenomenon described above with reference to FIG. 6 and FIG. 8.

Figure 14:
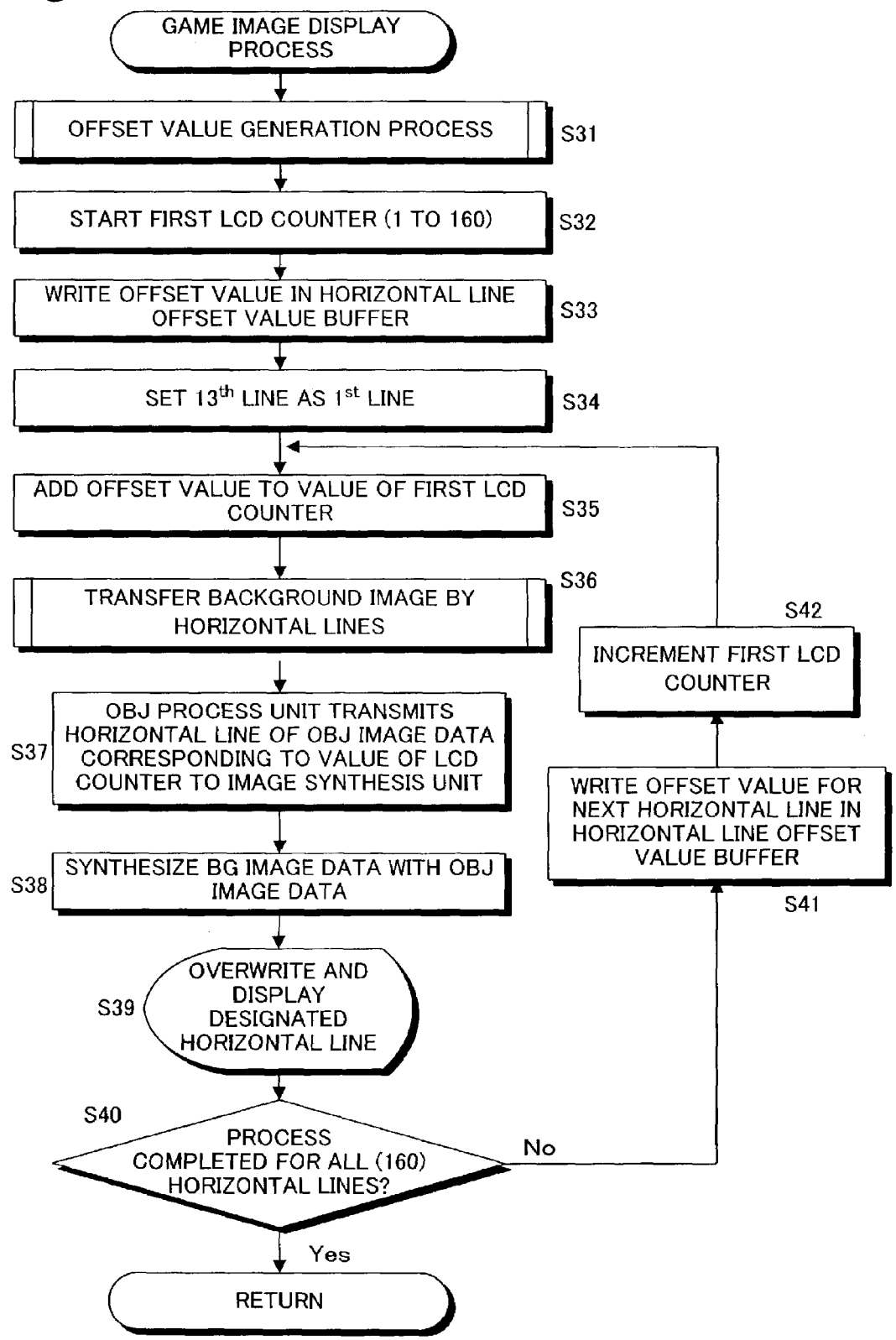
FIG. 14 is a flowchart illustrating the details of a game image display process of Step 6.

FIG. 14 is a flowchart illustrating the details of the game image display process of Step 6. In Step 31, the offset value generation process is performed by the CPU 201. In the present embodiment, the offset value sequence 46 is generated so that the same value occurs three times consecutively, after which the value is incremented by one. The offset value generation process will now be described in detail with reference to FIG. 15.

FIG. 15 is a flowchart illustrating the details of the offset value generation process of Step 31. First, in Step 51, all of the offset values stored in the work memory 203 are cleared. This is for erasing the offset values, which have been generated through the loop (Step 2 to Step 6) in the previous frame. In Step 52, it is determined whether or not the generation process flag is ON. The generation process flag is used for determining whether the current frame is an odd-numbered frame or an even-numbered frame. Specifically, the generation process flag being ON indicates that the current frame is an odd-numbered frame, and the generation process flag being OFF indicates that the current frame is an even-numbered frame. When it is determined in Step 52 that the generation process flag is ON, Step 53 to Step 55 are performed. Otherwise, Step 56 to Step 58 are performed.

In Step 53, the generation process flag is turned OFF so that in the next iteration of the loop, the offset value sequence 46 that is different from that generated in the current iteration of the loop is generated. In Step 54, the counter value is set to 157. The counter used herein indicates the number of offset values yet to be generated. In Step 55, (0, 0, 0) is stored as an offset value sequence. The number of offset values to be generated in the offset value generation process (the number of offset values to be contained in the offset value sequence 46) is equal to the number of vertical lines, i.e., 160, and three offset values are set in advance in Step 55. Therefore, the counter value is set to 157 in Step 54. After completion of Step 55, Step 59 is performed.

On the other hand, in Step 56, the generation process flag is turned ON for the same reason as that for Step 53. In Step 57, the counter value is set to 158. In Step 58, (0, 0) is stored as an offset value sequence. The number of offset values to be generated in the offset value generation process is equal to the number of vertical lines, i.e., 160, and two offset values are set in advance in Step 58. Therefore, the counter value is set to 158 in Step 57. After completion of Step 58, Step 59 is performed. Note that different numbers of offset values are set in Step 55 and in Step 58, as described above, whereby the subsequent offset value generation routine can be shared.

In Step 59, '1' is set in the A buffer. The value stored in the A buffer indicates an offset value to be set. In Step 60, '3' is set in the B buffer. The value stored in the B buffer indicates the number of times the same offset value is set consecutively. Specifically, when '3' is set in the B buffer, the offset values are set so that the same offset value occurs three times consecutively as in ( . . . , p, p, p, q, q, q, . . . ).

Then, in Step 61, it is determined whether or not the counter value is '0'. When the counter value is '0', the number of offset values yet to be generated is zero. Therefore, the offset value generation process is terminated. When the counter value is not '0', Step 62 is performed.

In Step 62, it is determined whether or not the value of the B buffer is '0'. When the value of the B buffer is '0', Step 63 and Step 64 are performed. When the value of the B buffer is not '0', Step 65 to Step 67 are performed.

In Step 63, the value of the A buffer is incremented by one. In Step 64, the value of the B buffer is set to '3'. Then, the process returns to Step 61. On the other hand, in Step 65, the value of the A buffer is first added to the offset value sequence. Then, in Step 66, the value of the B buffer is decremented by one. Then, in Step 67, the counter value is decremented by one. Then, the process returns to Step 61. Thereafter, the loop procedure from Step 62 to Step 67 is repeated until it is determined in Step 61 that the counter value is '0'.

Referring back to FIG. 14, in Step 32, the first LCD counter 218 is started. The value of the first LCD counter 218 indicates a horizontal line of the background image data to be outputted to the image synthesis process unit 213. Herein, the initial value of the first LCD counter 218 is set to '1'. Then, in Step 33, one of the offset values generated in Step 31 is written in the horizontal line offset value buffer 220. This offset value is the one that is first added to the offset value sequence in Step 31, i.e., the one that corresponds to the first horizontal line. In Step 34, the BG process unit 210 is instructed to set the 13$^{th}$ horizontal line of the background image data stored in the BG VRAM 209 as the first horizontal line to be displayed on the LCD 11 so as to exclude the upper 12 horizontal lines of the background image data.

In Step 35, the BG process unit 210 is instructed to add together the value of the first LCD counter 218 and the corresponding offset value. Specifically, the BG process unit 210 adds together the value of the first LCD counter 218 and the offset value stored in the horizontal line offset value buffer 220. Thus, the read-out horizontal line number is calculated (see FIG. 7), whereby the read-out horizontal line to be displayed and the decimation line are determined. In Step 36, the BG process unit 210 is instructed to transfer the background image by horizontal lines. The line to be transferred in Step 36 is the horizontal line that corresponds to the read-out horizontal line number. Thus, in Step 36, lines of the image are outputted successively. The process of Step 36 of transferring the background image by horizontal lines will now be described in detail with reference to FIG. 16.

Figure 16:
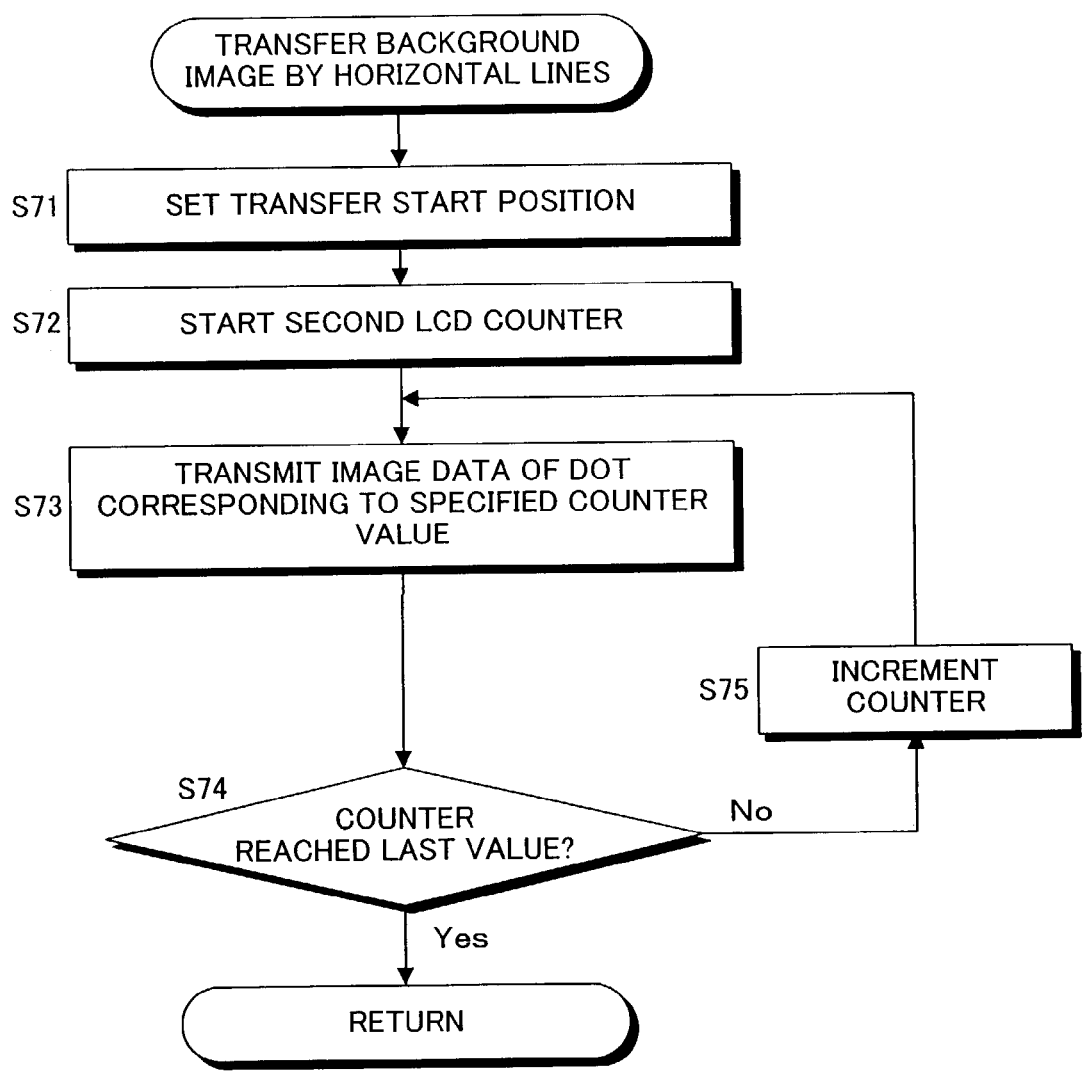
FIG. 16 is a flowchart illustrating the details of a process of Step 36 of transferring a background image by horizontal lines.

FIG. 16 is a flowchart illustrating the details of the process of Step 36 of transferring a background image by horizontal lines. First, in Step 71, the transfer start position is set by the BG process unit 210. Specifically, the transfer start position is set to the ninth dot so as to exclude the eight dots that are outside the safety frame. Then, in Step 72, the second LCD counter 219 is started. Herein, the BG process unit 210 sets the initial value of the second LCD counter 219 to '1'. In Step 73, the image data (i.e., color data) of a dot corresponding to the value of the second LCD counter 219 is read out from the BG VRAM and transmitted to the image synthesis process unit 213.

Then, in Step 74, it is determined whether or not the second LCD counter 219 has counted up to a predetermined limit value. Specifically, it is determined whether or not the value of the second LCD counter 219 is '240'. When it is determined in Step 74 that the limit value is reached, 240 dots (i.e., one line) of the background image data have all been transferred, and therefore the transfer process is terminated. Otherwise, Step 75 is performed. In Step 75, the second LCD counter 219 is incremented by one. After Step 75, the process returns to Step 73. Thereafter, Step 73 to Step 75 are repeated until the limit value is reached. Through Step 35 and Step 71 to Step 75, one horizontal line of image data that is selected based on the offset value is outputted. Thus, lines of the image are outputted successively.

Referring back to FIG. 14, in Step 37, the OBJ process unit 212 is instructed to transmit one line of object image data to the image synthesis process unit 213. In Step 37, one line of the object image data that is specified by the read-out horizontal line number is transmitted. In Step 38, the image synthesis process unit 213 is instructed to synthesize the background image data transferred from the BG process unit 210 in Step 36 with the object image data transmitted from the OBJ process unit 212 in Step 37 so as to generate the game image. Thus, in Step 38, the game image is generated and outputted by lines. In Step 39, the LCD 11 overwrites one line of its screen corresponding to the read-out horizontal line number to display one line of the game image. Herein, the LCD 11 overwrites the line of the screen with the line of the game image, which is obtained through the synthesis operation by the image synthesis process unit 213 in Step 38.

In Step 40, it is determined whether or not the overwrite/display process of Step 39 has been completed for all of the horizontal lines. When it is determined in Step 40 that the overwrite/display process has been completed, the game image display process is terminated. Otherwise, Step 41 and Step 42 are performed. Specifically, in Step 41, the offset value for the following horizontal line is written in the horizontal line offset value buffer 220. The offset value for the following horizontal line is the one that is generated following the offset value being currently stored in the horizontal line offset value buffer 220. Then, in Step 42, the value of the first LCD counter 218 is incremented by one. After Step 42, the process returns to Step 35. Thereafter, Step 35 to Step 42 are repeated until it is determined in Step 40 that the overwrite/display process is completed. In the embodiment described above, lines of image data are outputted successively while performing the decimation process. Therefore, it is possible to reduce the computational load, and the present embodiment is particularly suitable for image processing performed by an emulator.

Next, a variation of the process performed by the handheld game machine 1 will be described. In the embodiment described above, undecimated background image data is stored in the BG VRAM 209, and the decimation process is performed in the BG process unit 210 while outputting the background image data by horizontal lines. In contrast, in the present variation, the decimation process is performed when storing background image data in the BG VRAM 209 so that at least two different decimated background image data are stored in the BG VRAM 209. The present variation will now be described with reference to FIG. 17.

Figure 17:
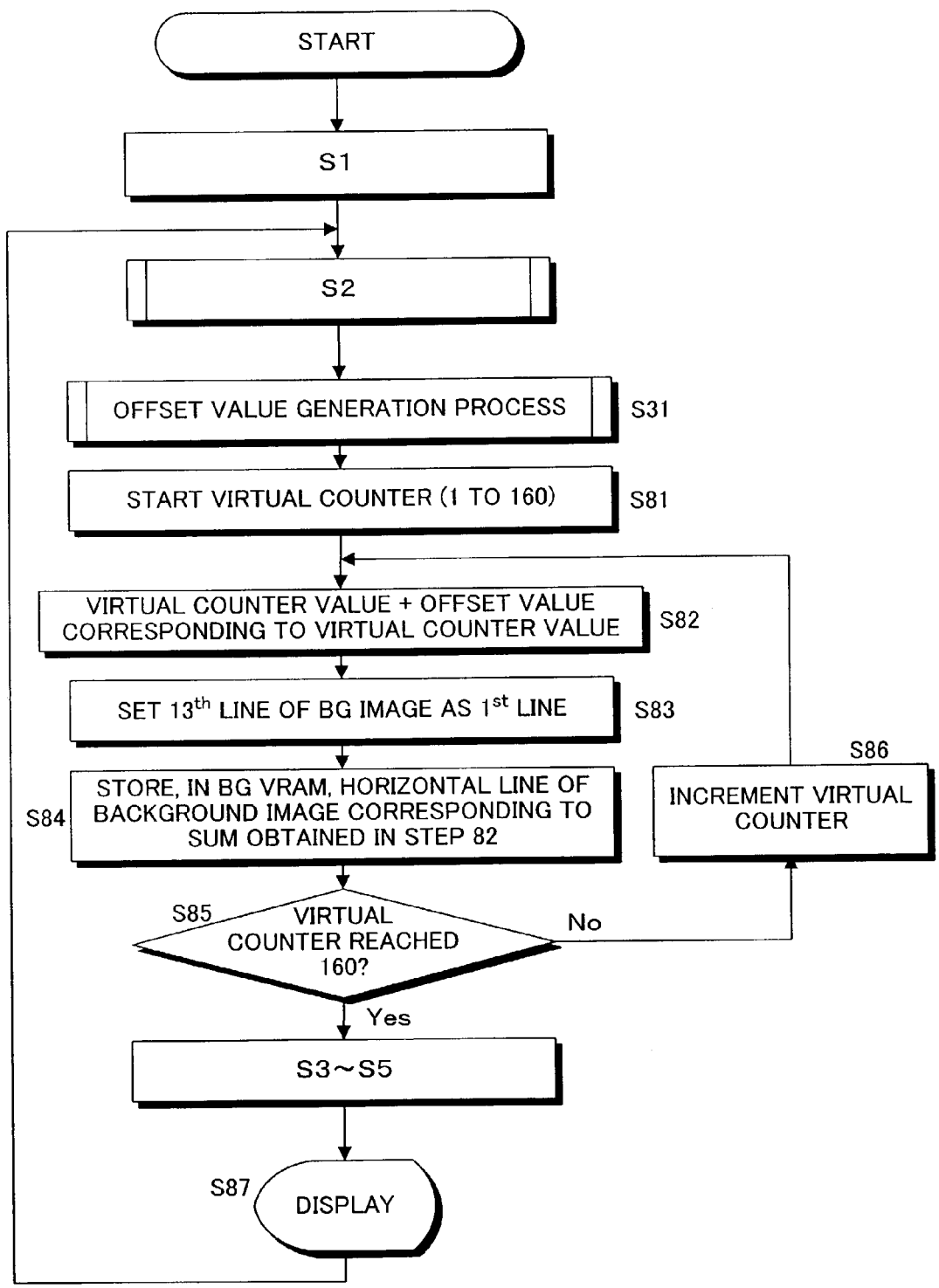
FIG. 17 is a flowchart illustrating a variation of the process performed by the hand-held game machine 1.

FIG. 17 is a flowchart illustrating a variation of the process performed by the hand-held game machine 1. Note that blocks in FIG. 17 that are as those in FIG. 12 will not be further described below. In FIG. 17, the steps up to Step 2 are as those of FIG. 12. In the present variation, the offset value generation process (Step 31) is performed after Step 2. Note that the offset value generation process itself is similar to that of the embodiment described above. Then, in Step 81, a virtual counter is started. The virtual counter corresponds to the first LCD counter 218 of the embodiment described above. In Step 81, the value of the virtual counter is set to 1.

In Step 82, the value of the virtual counter is added to the offset value corresponding to the virtual counter value. The resulting sum is the same as the read-out horizontal line value. Then, in Step 83, the $13^{th}$ horizontal line of the background image data stored in the work memory 203 is set as the first horizontal line to be displayed on the LCD 11 so as to exclude the upper 12 horizontal lines of the background image data, which are outside the safety frame. Then, in Step 84, one horizontal line of the background image data that corresponds to the sum obtained in Step 82 is stored in the BG VRAM 209.

In Step 85, it is determined whether or not the value of the virtual counter is 160. If not, Step 86 is performed. Specifically, in Step 86, the value of the virtual counter is incremented by one, and the process returns to Step 82. Thereafter, Step 82 to Step 86 are repeated until the it is determined in Step 85 that the value of the virtual counter is 160. On the other hand, when it is determined in Step 85 that the value of the virtual counter is not 160, Step 3 to Step 5 are performed. The procedure from Step 3 to Step 5 is similar to that of the embodiment described above. In the present variation, Step 87 is performed after Step 5. In Step 87, an image is displayed by the LCD 11. Specifically, the background image data is outputted from the BG process unit 210, and the object image data is outputted from the OBJ process unit 212. Then, the image synthesis process unit 213 is instructed to synthesize the background image data with the object image data and output the synthesized image data to the LCD 11.

In the present embodiment, it is assumed that only the background image is decimated. In another alternative embodiment, an object image may also be decimated. In such a case, the OBJ process unit 212 reads out predetermined horizontal lines of the object image data based on the values of the first LCD counter 218 and the horizontal line offset value buffer 220, and outputs the read-out data to the image synthesis process unit 213. Thus, the decimation process can be performed for the object image as for the background image.

Figure 18:
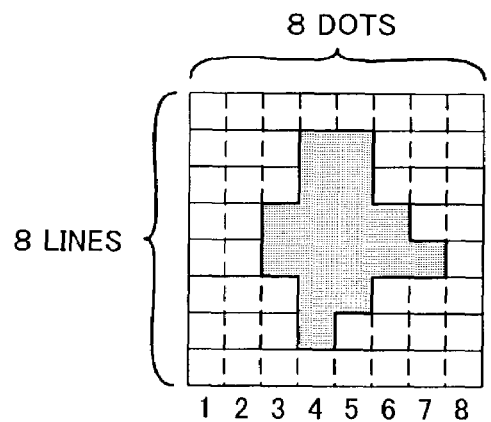
FIG. 18 is a diagram generally illustrating a method for decimating vertical lines.
Figure 18:
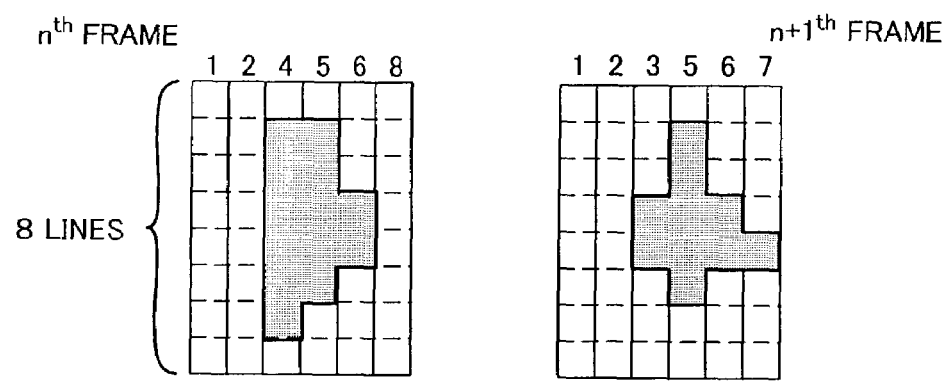
Figure 18:
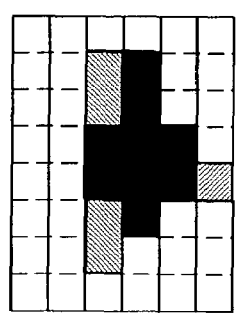

In the present embodiment, the process of decimating image data by removing different lines for each frame is performed only for horizontal lines. In another alternative embodiment, such a process may be performed for vertical lines. FIG. 18 generally illustrates a method for decimating vertical lines. The process illustrated in FIG. 18 is similar to that illustrated in FIG. 6. Specifically, the third and seventh vertical lines are removed in an $n^{th}$ frame, and the fourth and eighth vertical lines are removed in an $n+1^{th}$ frame. Thus, vertical lines can also be decimated in a manner similar to that described in the present embodiment. In still another alternative embodiment, horizontal lines and vertical lines may be both decimated.

In the present embodiment, different yet adjacent lines are removed alternately by frames. This is particularly effective for a liquid crystal monitor, which is an example of a display device, because the display response speed of a liquid crystal monitor is considerably lower than that of a CRT monitor, or the like. Alternatively, if the display response speed is sufficiently high, decimation lines may be changed once for every certain number of frames (e.g., once for every three frames). When the display response speed is low, increasing the number of decimation patterns may provide no significant advantage over the present embodiment. Rather, it has been found that when the decimation position is moved successively, for example, the display image as a whole appears to be rolling in waves.

In the present embodiment, when a $k^{th}$ line is removed in one frame, a line adjacent to the $k^{th}$ line is removed in the following frame. By testing various decimation patterns, it has been found that in this way, the original game image can be reproduced without giving any difference that is overly noticeable to the player.

As described above, according to the present embodiment, decimation lines are changed by frames, whereby when playing a game on a game machine of a low resolution, it is possible to reproduce a game image that is close to the original.

While the invention has been described in detail, the foregoing description is in all aspects illustrative and not restrictive. It is understood that numerous other modifications and variations can be devised without departing from the scope of the invention.

What is claimed is:

1. A computer-readable recording medium, comprising a game emulator program recorded thereon for executing a game program that is designed for a first game machine using a display device of a first resolution on a second game machine using a display device of a second resolution lower than the first resolution, the game program including data of a background image of the first resolution for forming a background of a game image and data of an object image to be overlaid on the background image, wherein:

in a predetermined frame in which the game image is generated by executing the game program, the game emulator program instructs the second game machine to perform the steps of:

determining, for horizontal lines and/or vertical lines of the background image, a first decimation line based on which the background image is decimated by lines;

converting the resolution of the background image to the second resolution by successively outputting lines of the background image while skipping a line of the background image corresponding to the first decimation line;

generating lines of a first game image by overlaying the object image on the lines of the background image being outputted when the object image concurs with the lines of the background image being output; and successively supplying the lines of the first game image to the display device of the second resolution, thereby displaying the first game image on the display device of the second resolution;

in a next frame following the predetermined frame, the game emulator program instructs the second game machine to perform the steps of:

determining one of two lines adjacent to the first decimation line to be a second decimation line;

converting the resolution of the background image to the second resolution by successively outputting the lines of the background image while skipping a line of the background image corresponding to the second decimation line;

generating lines of a second game image by overlaying the object image on the lines of the background image being outputted when the object image concurs with the lines of the background image being output; and successively supplying the lines of the second game image to the display device of the second resolution, thereby displaying the second game image on the display device of the second resolution.

2. The recording medium according to claim 1, wherein the game emulator program further instructs the second game machine to perform the step of generating at least two different offset value sequences, each offset value sequence being a factor in determining a decimation line based on which the background image of the first resolution is decimated by lines, wherein:

in the step of determining the first decimation line, the first decimation line is determined based on a value in one of the offset value sequences and a value specifying a horizontal line of the background image of the first resolution; and in the step of determining the second decimation line, the second decimation line is determined based on a value in the other one of the offset value sequences and a value specifying a horizontal line of the background image of the first resolution.

3. The recording medium according to claim 1, wherein in the step of determining the first decimation line, the first decimation line is determined for every certain number of lines.

4. The recording medium according to claim 1, wherein the game emulator program further instructs the second game machine to perform the step of determining a position at which the object image is overlaid on the background image whose resolution has been converted to the second resolution, based on a position at which the object image is overlaid on the background image of the first resolution and a ratio between the first resolution and the second resolution.

5. The recording medium according to claim 1, wherein the display device of the second resolution is a non-interlaced display device.

6. The recording medium according to claim 1, wherein in the step of determining the first decimation line, the first decimation line is selected from among the horizontal lines.

7. The recording medium according to claim 1, wherein in the step of determining the first decimation line, the first decimation line is selected from among the horizontal lines and the vertical lines.

8. The recording medium according to claim 1, wherein the game emulator program further instructs the second game machine to perform the steps of:

converting the object image into a second object image by removing a line of the object image corresponding to the first decimation line; and converting the object image into a third object image by removing a line of the object image corresponding to the second decimation line, wherein:

in the step of generating the first game image, the first game image is generated by overlaying the second object image on the background image whose resolution has been converted to the second resolution; and in the step of generating the second game image, the second game image is generated by overlaying the third object image on the background image whose resolution has been converted to the second resolution.

9. A computer-readable recording medium, comprising a game emulator program recorded thereon for executing a game program that is designed for a first game machine using a display device of a first resolution on a second game machine using a display device of a second resolution lower than the first resolution, the game program including data of a first background image of the first resolution for forming a background of a game image and data of an object image to be overlaid on the first background image, wherein the game emulator program instructs the second game machine to perform the steps of:

determining, for horizontal lines and/or vertical lines of the first background image, a first decimation line based on which the first background image is decimated by lines;

converting the first background image into a second background image of the second resolution by removing a line of the first background image corresponding to the first decimation line;

determining one of two lines adjacent to the first decimation line to be a second decimation line;

converting the first background image into a third background image of the second resolution by removing a line of the first background image corresponding to the second decimation line;

generating a first game image by overlaying the object image on the second background image;

generating a second game image by overlaying the object image on the third background image; and displaying the first game image and the second game image alternately by frames on the display device of the second resolution.

10. The recording medium according to claim 9, wherein the game emulator program further instructs the second game machine to perform the step of generating at least two different offset value sequences, each offset value sequence being a factor in determining a decimation line based on which the first background image is decimated by lines, wherein:

in the step of determining the first decimation line, the first decimation line is determined based on a value in one of the offset value sequences and a value specifying a horizontal line of the first background image; and in the step of determining the second decimation line, the second decimation line is determined based on a value in the other one of the offset value sequences and a value specifying a horizontal line of the first background image.

11. The recording medium according to claim 9, wherein in the step of determining the first decimation line, the first decimation line is determined for every certain number of lines.

12. The recording medium according to claim 9, wherein the game emulator program further instructs the second game machine to perform the step of determining a position at which the object image is overlaid on the background image whose resolution has been converted to the second resolution, based on a position at which the object image is overlaid on the first background image and a ratio between the first resolution and the second resolution.

13. The recording medium according to claim 9, wherein the display device of the second resolution is a non-interlaced display device.

14. The recording medium according to claim 9, wherein in the step of determining the first decimation line, the first decimation line is selected from among the horizontal lines.

15. The recording medium according to claim 9, wherein in the step of determining the first decimation line, the first decimation line is selected from among the horizontal lines and the vertical lines.

16. The recording medium according to claim 9, wherein the game emulator program further instructs the second game machine to perform the steps of:

converting the object image into a second object image by removing a line of the object image corresponding to the first decimation line; and converting the object image into a third object image by removing a line of the object image corresponding to the second decimation line, wherein:

in the step of generating the first game image, the first game image is generated by overlaying the second object image on the second background image; and in the step of generating the second game image, the second game image is generated by overlaying the third object image on the third background image.

* * * * *